March 6, 1962
G. J. MARKOVICH
3,023,584
FLUID SYSTEM AND RELIEF VALVE ASSEMBLY THEREFOR
Filed May 16, 1960
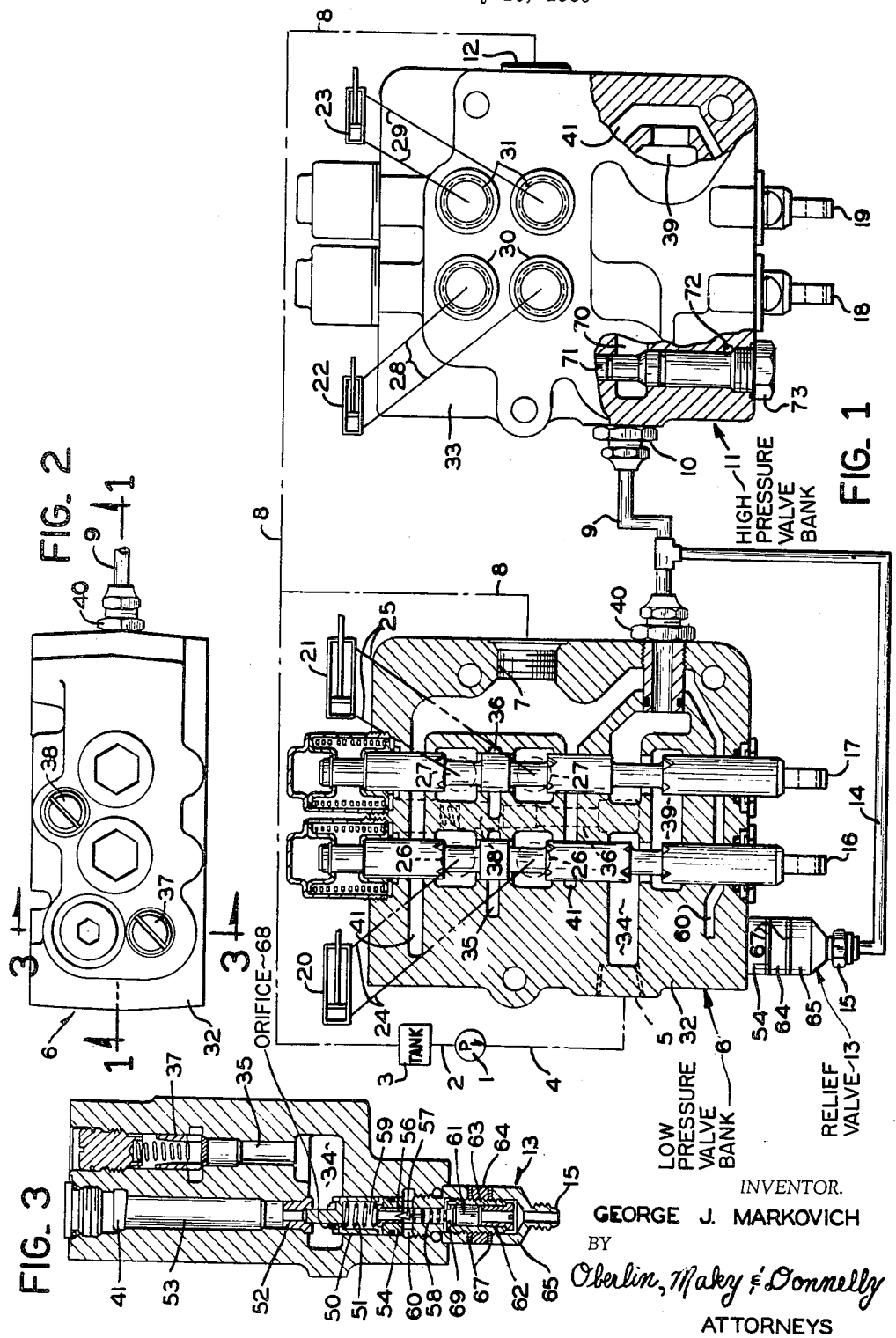
INVENTOR.
GEORGE J. MARKOVICH
BY
Oberlin, Maky & Donnelly
ATTORNEYS

United States Patent Office 3,023,584
Patented Mar. 6, 1962

3,023,584
FLUID SYSTEM AND RELIEF VALVE ASSEMBLY THEREFOR
George J. Markovich, Cleveland, Ohio, assignor to Parker-Hannifin Corporation, Cleveland, Ohio, a corporation of Ohio
Filed May 16, 1960, Ser. No. 29,384
21 Claims. (Cl. 60—97)

The present invention relates generally as indicated to a fluid system and relief valve assembly therefor, and more particularly to a fluid system that comprises a pump, a reservoir, a plurality of fluid motors, a plurality of directional control valves for said motors, and a unitary relief valve assembly that has different relief pressures according to which one or which set of the control valves is actuated.

It is, of course, known in the art to provide fluid systems in which the control valves or the banks of control valves have their own relief valves set for desired relief pressures, but obviously, in such systems the relief valve set for a low pressure must be downstream of the relief valve set for a high pressure. This is contrary to the usual desired flow characteristics of the control valves and motors since it is usually the practice to employ small valves and motors for high pressure-low volume requirements and large valves and motors for low pressure-high volume requirements. Accordingly, the small valves with the small passages must be disposed upstream of the large valves with the large passages whereby larger than desired pressure drops are encountered by reason of the low pressure-high volume flow having first to flow through the small valves prior to flowing to the large valves.

In view of the foregoing, it is a principal object of this invention to provide a fluid system and unitary relief valve assembly therefor in which the low pressure valves are nearest the pump and the high pressure valves are downstream of the low pressure valves whereby pressure drops to the low pressure valves and to the high pressure valves are reduced to a minimum.

It is another object of this invention to provide a fluid system in which the relief valve assembly aforesaid is associated with two banks of directional control valves in such a way that the pressure of the fluid between the pump and the bank of low pressure valves may reach two different values according to whether one or more of the low pressure upstream valves are actuated or any one or more of the high pressure downstream valves are actuated.

It is another object of this invention to provide a fluid system and relief valve assembly as aforesaid which is of simple and economical construction, and which enables connection together of conventional banks of directional control valves.

It is another object of this invention to provide a novel form of relief valve assembly which has a pressure port adapted to be connected to the pressure line between the discharge port of the pump and the inlet port of the low pressure bank of control valves, a tank port adapted to conduct fluid from the pressure line to the tank when the relief valve member is unseated, and a control port adapted to be connected to the portion of the pressure line between the low pressure and high pressure banks of control valves, the presence of fluid under pressure in the control port being effective to increase the pressure at which the relief valve member is unseated to open the pressure port to the tank port.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a drawing showing the fluid system that constitutes the present invention; the pump, the tank, the motors, and the relief valve connections being shown schematically, one bank of directional control valves being in cross-section as viewed along line 1—1, FIG. 2;

FIG. 2 is a top plan view of the low pressure bank of directional control valves, it being understood that the high pressure bank of directional control valves may be of the same or similar construction; and FIG. 3 is a cross-section view taken substantially along the line 3—3, FIG. 2, showing in detail the structure of the relief valve assembly.

Referring now more particularly to the drawings and first to FIG. 1, the fluid system herein comprises a pump 1 having its intake port connected by conduit 2 to a fluid tank or reservoir 3 and its discharge port connected by conduit 4 to the pressure inlet port 5 of the bank 6 of low pressure directional control valves. Bank 6 has a tank port 7 connected by conduit 8 to the tank 3. A carryover or bypass conduit 9 leads from bank 6 to the inlet port 10 of the bank 11 of high pressure directional control valves and thus, in effect, constitutes an extension of the pressure inlet port 5 and in turn, the tank port 12 of the bank 11 of high pressure directional control valves is connected back to the tank 3 via the return line 8.

In a manner hereinafter explained in detail there is a relief valve 13 formed as a part of bank 6 and having a control line 14 leading from the control port 15 to the carryover conduit 9.

Herein each bank 6 and 11 comprises two directional control valves 16—17 and 18—19, respectively, for controlling the direction of operation of the pistons of the respective fluid motors 20—21, and 22—23. Conduits 24 and 25 operatively connect the motors 20—21 to the service ports 26; 26 and 27; 27 of bank 6, and conduits 28 and 29 operatively connect the motors 22—23 to the service ports 30; 30 and 31; 31 of bank 11. It is to be understood that each bank 6 and 11 may comprise one, two, three or any number of directional control valves.

By way of example only, the valves 16—17, and 18—19 herein are shown as being 4-way spring-centered spool valves that are axially movable in parallel bores formed in the respective valve housings 32 and 33.

Reference will now be made to bank 6 in detail and it is to be understood that bank 11 may be of similar construction. First of all, the inlet port 5 leads to an inlet chamber 34 which is intersected by pressure branches 35 and 36 provided with the respective check valves 37 and 38 upstream of the respective valves 16 and 17 so as to prevent interflow of fluid when both valves are operated at the same time. Also intersecting the inlet chamber 34, via the valves 16 and 17, is a bypass passage 39 which, in a conventional two spool valve, normally connects with the tank port 7. However, in this case the fluid flowing through the bypass 39 (when both valves 16 and 17 are in neutral position as shown) flows through the carry-over fitting 40 and through conduit 9 to the pressure inlet port 10 of the high pressure bank 11. In the case of bank 11 the corresponding bypass will connect directly with tank port 12 whereby when all of the valves 16, 17, 18, and 19 are in neutral position the discharge from pump 1 will be freely circulated through the bypass of both banks 6 and 11 via carry-over conduit 9 and the return line 8 connected to tank port 12.

The respective pressure branches 35 and 36 (downstream of the respective check valves 37 and 38) intersect the respective spool valve bores between the respective pairs of service ports 26; 26 and 27; 27. Also intersecting the spool valve bores and straddling the service ports are return passages 41 that lead to tank port 7. The spool valves 16 and 17 are formed with alternate lands and grooves so arranged that when either valve is shifted axially from neutral in one direction or the other, the bypass 39 is closed and the inlet pressure branch 35 or 36 is communicated with one of the service ports 26 or 27 and the other one of the service ports 26 or 27 is communicated with one of the return passages 41 whereby the piston in cyclinder 20 or 21 is moved in the desired direction. It can thus be seen that when the inlet pressure branch 35 or 36 is communicated with one of the service ports 26 or 27, the latter are then extensions of the pressure inlet port 5, the pressure inlet chamber 34, and the associated inlet pressure branch 35 or 36, as the case may be.

As aforesaid the bank 11 may be of substantially the same construction as bank 6 except that no carry-over fitting 40 is required. In any event when the valves 18 and 19 are 4-way spools, the actuation of one or the other from neutral effects closing of the bypass in bank 11 so that pressure can build up to actuate the selected motor 22 or 23.

The relief valve 13 herein is of the pilot-operated type and comprises main valve member 50 urged by spring 51 into engagement with seat 52 to close communication between inlet chamber 34 and the branch 53 of return passage 41. The spring 51 is backed up by pilot valve body 54 which is screwed into valve housing 32, said body 54 having a pilot valve seat 56 against which the pilot valve 57 is urged by spring 58 to close communication between chamber 59 and return passage 60. The pilot valve spring 58 is backed up by an adjustable plunger 61-sleeve 62-threaded bushing 63 assembly, the bushing 63 of which is screwed into body 54 and locked by nut 64 and cap 65 with intervening washers 67.

When one or the other of the spool valves 16 or 17 is shifted from neutral, the pressure in inlet chamber 34 builds up to actuate the selected motor 20 or 21. When that pressure in chamber 34 and also in chamber 59 (via orifice 68) exceeds the seating influence of spring 58 on pilot valve 57, the latter is forced away from its seat 56 to bleed the chamber 59 to return passage 60 at a rate faster than fluid can be replenished through orifice 68 whereby the pressure drops in chamber 59 relative to the pressure in inlet chamber 34 to an extent sufficient to unseat the main valve member 50 against spring 51 and thereby relieve the excess pressure in chamber 34 to the return branch 53. By way of example only, that pressure may be say 1350 p.s.i.

It is to be noted that the cap 65 is formed with the control port 15 which is communicated with the carry-over conduit 9 by way of conduit 14. Now, when either of the spool valves 18 or 19 is shifted from neutral (while valves 16 and 17 are in neutral) the bypass in housing 33 is closed and the pressure in inlet chamber 34, bypass 39, carry-over conduit 9 and in the inlet chamber of inlet port 10 builds up to actuate the selected motor 22 or 23. As the pressure builds up in the carry-over conduit 9 and control line 14 it acts on the end of the plunger 61 and forces it against the shoulder 69 of bushing 63 thereby additionally compressing the pilot valve spring 58 whereby a substantially higher pressure in inlet chamber 34, and in main valve chamber 59 is required in order to unseat the pilot valve 57.

The area of plunger 61, and the strength of the spring 58, are preferably selected in relation to the pilot valve area so that a relatively low pressure of say 300–500 p.s.i. in the carry-over conduit 9 and in the control line 14 is sufficient to urge the plunger 61 firmly against shoulder 69 so as to compress spring 58 a fixed amount much prior to the time that the higher relief pressure is reached in chamber 34, chamber 59, bypass 39, carry-over conduit 9 and control line 14. Thus, with the additional predetermined compression on pilot valve spring 58, it now requires a higher pressure in chambers 34 and 59 to unseat the pilot valve 57 with consequent unseating of the main valve 50. For example, that higher relief pressure may be, say 1950 p.s.i. when any one of the bank 11 valves are actuated, whereas the relief pressure may be, as aforesaid, 1350 p.s.i. when any one of the bank 6 valves are actuated.

When using a standard two spool housing 33 for bank 11 the usual relief ports from inlet chamber 70 to return branch 71 and to pilot return passage 72 will be closed as by the plug 73 which is screwed into the housing 33.

Accordingly, it can be seen from the foregoing that the present invention provides a unique two-pressure relief system that enables the provision of two banks of directional control valves connected in sequence for operation at different relief pressures with the low pressure-high volume valves (and usually the larger valves) located upstream of the high pressure-low volume valves.

Other modes of applying the principle of the invention may be employed, change being made as regards the details described, provided the features stated in any of following claims, or the equivalent of such, be employed.

I therefore particularly point out and distinctly claim as my invention:

1. A fluid power system comprising a pump; at least two fluid pressure operated units and control valves therefor; a pressure supply conduit interconnecting said pump with said units for selective operation of either one through its associated control valve; a pressure relief valve having a pressure port in fluid communication with said pressure supply conduit upstream of both control valves, and having a control port in fluid communication with said pressure supply conduit downstream of one control valve and upstream of the other; said relief valve having a spring-based valve member exposed to fluid under pressure in said pressure port and operative to vent said pressure supply conduit through said pressure port at a prescribed pressure when said one control valve and its associated unit are operated; said relief valve also having a spring backup member exposed to fluid under pressure in said control port and operative to increase the spring bias on said valve member when said other control valve and its associated unit are operated whereby said valve member is operative to vent said pressure supply conduit through said pressure port at a greater pressure when said other control valve and its associated unit are operated than when said one control valve and its associated unit are operated.

2. The system of claim 1 wherein said control valves are provided with a common bypass passage through which, and said pressure supply conduit, fluid freely flows from said pump when neither unit is being operated; each control valve having a movable valve member that closes its bypass passage portion when moved to operate its associated unit to divert such flow to the latter.

3. The system of claim 1 wherein said relief valve is of the pilot-operated type in which there is provided an orifice to expose the other side of said spring-biased valve member to fluid under pressure in said pressure port; and wherein said spring-backup member acts on a pilot valve member which vents the pressure acting thereon and on such other side of said spring-biased valve member more rapidly than it can be replenished through such orifice and thereby creates a pressure differential on said spring-biased valve member sufficient to move it to vent said pressure port and pressure supply conduit at different pressures as aforesaid according to whether said one control valve or said other control valve is operated.

4. The system of claim 1 wherein each control valve has a movable control valve member which is movable from neutral position blocking flow of fluid from said pressure supply conduit to the associated unit to an operating position conducting fluid under pressure to the associated unit; and wherein each control valve has a bypass passage which is a part of said pressure supply conduit when said control valve member is in neutral position; the bypass passages of the respective control valves being closed when the respective control valve members are moved to operating position.

5. The system of claim 4 wherein said pressure supply conduit leads from the pump to the upstream side of the bypass passage of said one control valve and from the downstream side of the bypass passage of said one control valve to the upstream side of the bypass passage of said other control valve.

6. The system of claim 5 wherein said control valves are four-way directional control valves; and said units are double-acting hydraulic cylinders.

7. A fluid power system comprising a reservoir for fluid; a pump having an intake port in fluid communication with said reservoir, and a discharge port from which fluid is delivered under pressure; at least two fluid motors adapted to be actuated by fluid under pressure delivered by said pump; directional control valves operatively interposed between said pump and the respective motors to control actuation thereof when valve members in said control valves are shifted from neutral off positions; each control valve having an inlet port for fluid under pressure, service ports for connection with the associated fluid motor, a return port through which fluid displaced by the associated motor is returned to said reservoir, and a bypass passage through which fluid flows from the inlet port of one control valve to the return port of the other only when both valve members are in neutral position whereas, when the valve member of said one control valve is shifted from neutral, its bypass passage is closed to thereby divert flow of fluid to the associated fluid motor and whereas, when the valve member of said other control valve is shifted from neutral, its bypass passage is closed to divert the flow of fluid from the then open bypass passage of said one control valve to the fluid motor associated with said other control valve; and a relief valve having a pressure port in fluid communication with the pressure circuit between said pump and said one control valve, a relief port in fluid communication with said reservoir, and a control port in fluid communication with the bypass circuit between said control valves; said relief valve comprising a spring-biased valve member which closes communication between said pressure port and said relief port except when the magnitude of the fluid pressure in the pressure circuit exceeds the spring bias on said spring-biased valve member during actuation of the fluid motor associated with said one control valve, and a fluid pressure actuated member effective to increase the spring-bias on said spring-biased valve member responsive to fluid pressure in said control port as occasioned by actuation of said other other control valve whereby said spring-biased valve member is held closed until the magnitude of the fluid pressure in the pressure circuit reaches a value to overcome the increased spring-bias.

8. The system of claim 7 wherein said relief valve is of the pilot-operated type including said spring-biased valve member as the main valve member, and a spring-biased pilot valve member on the spring of which said fluid pressure actuated member acts to increase the pressure at which said pilot valve member opens to permit opening of said main valve member.

9. A directional control valve and relief valve assembly for actuating at least two fluid motors at different maximum pressures; said assembly comprising two banks of directional control valves each including at least one directional control valve for a fluid motor; each control valve having an inlet port for fluid under pressure, service ports for connection with a fluid motor, a return port for return of fluid displaced by the motor to a reservoir, and a bypass passage adapted to communicate said inlet port with such reservoir when said service ports are closed and adapted to be closed when said service ports are communicated with said inlet and return ports; the bypass passages of said control valves being arranged serially for flow of fluid from the inlet port of one control valve and through its bypass passage to the inlet port of the other control valve; and a pressure relief valve having a pressure port in fluid communication with the inlet port of said one control valve, a relief port in fluid communication with one of the return ports of said control valves, and a control port in fluid communication with the inlet port of said other control valve; said relief valve comprising a spring-biased valve member exposed to fluid under pressure in said pressure port and operative to communicate said pressure port with said relief port when the fluid pressure in the inlet port of said one control valve exceeds a predetermined value during actuation of the latter, and a fluid pressure actuated member exposed to fluid under pressure in said control port and operative to increase the spring-bias on said valve member when said other control valve is actuated whereby said valve member communicates said pressure port with said relief port at a greater fluid pressure in the inlet port of said one control valve and in the inlet port of said other control valve when the latter is actuated than when said one control valve is actuated.

10. The assembly of claim 9 wherein said relief valve is provided with a stop for said fluid pressure actuated member against which the latter is urged by a fluid pressure in said control port which is substantially less than that at which said valve member communicates said pressure port with said relief port.

11. The assembly of claim 9 wherein said relief valve is of the pilot-operated type wherein the side of said valve member opposite to that exposed to fluid pressure in said pressure port is also exposed to such pressure via an orifice, and wherein a spring-biased pilot valve member is effective, when unseated by fluid pressure acting on such opposite side of said valve member, to drop such pressure whereby said valve member is unseated by the then predominant fluid pressure in said pressure port acting on one side of said valve member; said fluid pressure actuated member acting to increase the spring bias of said pilot valve member.

12. The assembly of claim 9 wherein said one control valve comprises a housing with a movable directional control valve member therein; and wherein said relief valve comprises a body secured to said housing and a control conduit connected between said control port and the inlet port of said other control valve.

13. The assembly of claim 9 wherein each bank of directional control valves comprises a plurality of directional control valves arranged for selective and concurrent actuation.

14. The assembly of claim 13 wherein each bank of directional control valves has check valves between said inlet port and the respective directional control valves to preclude backflow and interflow of fluid when two or more of them are actuated concurrently.

15. A directional control valve and relief valve assembly comprising a housing for said control valve formed with an inlet passage communicable selectively through a movable control valve member in said housing with one of a pair of service ports adapted to be connected to a fluid motor, a return passage communicable selectively through said control valve member with the other one of said service ports to return fluid to a reservoir, a bypass passage which is closed by said control valve member when moved to communicate said inlet and return passages with said service ports and which is opened by said control valve member when in position closing communication of said inlet and return passages with said service ports for flow of fluid through said inlet and bypass passages to the inlet passage of a succeeding like directional control valve, and a relief passage communicating said inlet passage with said return passage; a relief valve having a spring-biased relief valve member which has one side exposed to fluid pressure in said inlet passage and which closes said relief passage except when the fluid pressure in said inlet passage builds up to overcome the spring bias while said control valve member is in a position closing said bypass passage; and a fluid pressure actuated member exposed to fluid pressure which builds up in said bypass passage while said control valve member is in a position opening said bypass passage and actuated by such fluid pressure to increase the spring bias on said relief valve member whereby a greater fluid pressure in said inlet passage is required to overcome the spring bias and thus to open said relief passage for flow of fluid from said inlet passage to said return passage.

16. The assembly of claim 15 wherein said relief valve member has its other side exposed to fluid under pressure in said inlet passage via an orifice; wherein a spring-biased pilot valve member is adapted to vent the fluid acting on such other side faster than it can be replenished through such orifice to thus create a pressure differential to move said relief valve member to open said relief passage, and wherein said fluid pressure actuated member is effective to increase the spring bias on said pilot valve member.

17. The assembly of claim 15 wherein said fluid pressure actuated member is moved against a stop by a fluid pressure substantially less than the relief pressure to predeterminedly increase the spring bias on said relief valve member and to resist movement away from said stop under the influence of the higher pressure acting on said relief valve member.

18. A relief valve assembly for use with two banks of directional control valves each of which has at least one control valve member therein operative in one position to open a bypass passage for flow of fluid therethrough from an inlet passage and in another position to close said bypass passage for flow of fluid from said inlet passage to a fluid motor; said relief valve comprising a housing; a spring-biased relief valve member in said housing adapted to vent the inlet passage in one control valve at a prescribed fluid pressure when its bypass passage is closed; and a fluid pressure actuated member in said housing adapted to be exposed to fluid under pressure in the inlet passage of the other control valve when its bypass passage is closed but while the bypass passage of said one control valve is open and effective to increase the spring bias on said relief valve member whereby the inlet passage of said one control valve is then vented at a greater fluid pressure.

19. The assembly of claim 18 wherein a stop is provided for said fluid pressure actuated member against which the latter is urged by fluid pressure substantially less than such greater fluid pressure.

20. The assembly of claim 18 wherein said relief valve member constitutes the main orificed relief valve member of a pilot operated relief valve assembly; wherein a spring-biased pilot valve member controls actuation of said main relief valve member; and wherein said fluid-pressure actuated member is effective to increase the spring bias on said pilot valve member.

21. A fluid power system comprising a pump having a fluid pressure delivery port; a pressure supply conduit operatively connected with said delivery port and including an extension for fluid motor actuation; control valve means selectively operable to utilize fluid under pressure in said conduit and in said conduit and extension for motor actuation; a pressure relief valve having a pressure port in fluid communication with said pressure conduit, and having a control port in fluid communication with said extension; said relief valve having a spring-biased valve member exposed to fluid under pressure in said pressure port to vent said conduit at a prescribed pressure when utilized for motor actuation; said relief valve also having a spring backup member exposed to fluid under pressure in said control port and operative to increase the spring bias on said valve member when said extension is utilized for motor actuation whereby said valve member is operative to vent said pressure supply conduit through said pressure port at a greater pressure when said extension is utilized for motor actuation.

References Cited in the file of this patent

UNITED STATES PATENTS

| | | |
|---|---|---|
| 2,267,177 | Twyman | Dec. 23, 1941 |
| 2,573,563 | Gardiner | Oct. 30, 1951 |